United States Patent
O'Neill et al.

(10) Patent No.: US 10,414,148 B2
(45) Date of Patent: Sep. 17, 2019

(54) SELECTIVE POWDER DOSING FOR AN ADDITIVELY MANUFACTURING SYSTEM

(71) Applicant: United Technologies Corporation, Farmington, CT (US)

(72) Inventors: Christopher F. O'Neill, Hebron, CT (US); Jesse R. Boyer, Middletown, CT (US); Anthony Pizzola, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 24 days.

(21) Appl. No.: 15/353,032

(22) Filed: Nov. 16, 2016

(65) Prior Publication Data

US 2018/0134027 A1 May 17, 2018

(51) Int. Cl.

| | |
|---|---|
| *B33Y 30/00* | (2015.01) |
| *B29C 64/321* | (2017.01) |
| *B29C 64/343* | (2017.01) |
| *B29C 64/336* | (2017.01) |
| *B29C 64/153* | (2017.01) |
| *B29C 64/329* | (2017.01) |
| *B33Y 40/00* | (2015.01) |
| *B33Y 50/02* | (2015.01) |
| *B33Y 10/00* | (2015.01) |
| *G01F 11/18* | (2006.01) |

(Continued)

(52) U.S. Cl.
CPC ............ *B33Y 30/00* (2014.12); *B22F 3/1055* (2013.01); *B23K 26/342* (2015.10); *B23K 26/702* (2015.10); *B28B 1/001* (2013.01); *B29C 64/321* (2017.08); *B29C 64/336* (2017.08); *B29C 64/343* (2017.08); *B33Y 40/00* (2014.12); *B33Y 50/02* (2014.12); *B65G 11/206* (2013.01); *F16K 3/0209* (2013.01); *F16K 3/0245* (2013.01); *F16K 3/03* (2013.01); *G01F 11/18* (2013.01); *B22F 2003/1056* (2013.01); *B29C 64/153* (2017.08); *B29C 64/329* (2017.08); *B33Y 10/00* (2014.12); *Y02P 10/295* (2015.11)

(58) Field of Classification Search
CPC .... B23K 26/342; B23K 26/702; B28B 1/001; B33Y 10/00; B33Y 30/00; B33Y 50/02; B65G 11/206; B29C 31/066
USPC ....................................................... 425/472
See application file for complete search history.

(56) References Cited

U.S. PATENT DOCUMENTS

| | | |
|---|---|---|
| 3,173,840 A | 3/1965 | Hostetler |
| 3,791,558 A | 2/1974 | Katusha |

(Continued)

FOREIGN PATENT DOCUMENTS

| | | |
|---|---|---|
| DE | 3036018 A1 | 3/1981 |
| WO | 2010007396 A1 | 1/2010 |
| WO | 2011085946 A1 | 7/2011 |

OTHER PUBLICATIONS

European Search Report dated Apr. 18, 2018 for corresponding European Patent Application No. 17201630.5.

*Primary Examiner* — Matthew J Daniels
*Assistant Examiner* — Yunju Kim
(74) *Attorney, Agent, or Firm* — Bachman & LaPointe, P.C.

(57) ABSTRACT

An additive manufacturing system can include a powder dispenser; a gate adjacent to the powder dispenser; a recoater blade system; and a control operable to move the gate with respect to the powder dispenser to selectively dispense powder from the powder dispenser.

10 Claims, 4 Drawing Sheets

(51) Int. Cl.
  *B22F 3/105* (2006.01)
  *B65G 11/20* (2006.01)
  *B23K 26/70* (2014.01)
  *F16K 3/02* (2006.01)
  *B23K 26/342* (2014.01)
  *B23B 1/00* (2006.01)
  *F16K 3/03* (2006.01)
  *B28B 1/00* (2006.01)

(56) References Cited

U.S. PATENT DOCUMENTS

| | | |
|---|---|---|
| 3,847,191 A | 11/1974 | Aronson |
| 4,116,247 A | 9/1978 | Zanasi |
| 4,850,259 A | 7/1989 | Morris |
| 5,583,304 A | 12/1996 | Kalidindi |
| 5,651,401 A * | 7/1997 | Cados .................. B65B 1/36 141/103 |
| 5,865,012 A | 2/1999 | Hansson et al. |
| 6,065,509 A | 5/2000 | Bonney et al. |
| 6,223,953 B1 | 5/2001 | Arslanouk et al. |
| 6,226,962 B1 | 5/2001 | Eason et al. |
| 6,267,155 B1 | 7/2001 | Parks et al. |
| 6,357,490 B1 | 3/2002 | Johnston et al. |
| 6,886,612 B2 | 5/2005 | Duffield |
| 6,985,798 B2 | 1/2006 | Crowder et al. |
| 7,118,010 B2 | 10/2006 | Crowder et al. |
| 7,868,260 B2 | 1/2011 | MacMichael et al. |
| 8,191,587 B2 | 6/2012 | Luechinger et al. |
| 8,720,497 B2 | 5/2014 | Meckstroth et al. |
| 8,776,840 B2 | 7/2014 | Meckstroth |
| 9,486,962 B1 | 11/2016 | Dugan et al. |
| 2004/0060265 A1 | 4/2004 | Boeckle et al. |
| 2005/0040185 A1 | 2/2005 | MacMichael et al. |
| 2009/0014086 A1 | 1/2009 | MacMichael et al. |
| 2011/0223349 A1 * | 9/2011 | Scott .................. B22F 3/1055 427/532 |
| 2015/0035186 A1 * | 2/2015 | Teken .................. B41J 2/14145 264/40.4 |
| 2015/0367415 A1 | 12/2015 | Buller et al. |

* cited by examiner

SELECTIVE POWDER DOSING FOR AN ADDITIVELY MANUFACTURING SYSTEM

BACKGROUND

The present disclosure relates generally to a method and apparatus for additive manufacturing, and more particularly to selective powder dosing.

Additive manufacturing systems provide for the growth of a three-dimensional component by projecting a laser beam onto a powder bed in numerous slices, each slice defining a cross section of the component. The additive manufacturing process sequentially builds-up layers of atomized alloy powder material and/or ceramic powder material. Although effective, there are a relatively limited number of systems and methods to selectively dispense the powder. These methods may be wasteful, difficult to control, and/or specific to the particular equipment manufacturer.

SUMMARY

An additive manufacturing system according to one disclosed non-limiting embodiment of the present disclosure can include a powder dispenser; a gate adjacent to the powder dispenser; and a control operable to move the gate with respect to the powder dispenser to selectively dispense powder from the powder dispenser through the gate.

A further embodiment of the present disclosure may include, wherein the control is operable to adjust a position of the gate to selectively dispense powder from the powder dispenser with respect to a movement direction of a recoater blade.

A further embodiment of the present disclosure may include, wherein the control is operable to adjust a position of the gate to selectively dispense one of a multiple of powders from the powder dispenser with respect to a movement direction of a recoater blade.

A further embodiment of the present disclosure may include, wherein the gate slides with respect to the powder dispenser.

A further embodiment of the present disclosure may include that the gate rotates with respect to the powder dispenser.

A further embodiment of the present disclosure may include that the gate rotates around the powder dispenser as a continuous loop.

A further embodiment of the present disclosure may include at least one aperture of a particular size.

A further embodiment of the present disclosure may include at least one aperture of a particular shape.

A further embodiment of the present disclosure may include that a multiple of identical apertures that form a pattern.

A further embodiment of the present disclosure may include a multiple of different aperture shapes and patterns.

A further embodiment of the present disclosure may include, wherein the control is operable to adjust a position of the gate perpendicular to a movement direction of the recoater blade.

A further embodiment of the present disclosure may include, wherein the control is operable to adjust a position of the gate to select one of a multiple of apertures.

A method of additive manufacturing according to one disclosed non-limiting embodiment of the present disclosure can include moving a gate with respect to a powder dispenser to selectively dispense powder from the powder dispenser through the gate, the gate movable relative to movement of a recoater blade.

A further embodiment of the present disclosure may include sliding a control strip.

A further embodiment of the present disclosure may include rotating a control strip formed as a continuous loop.

A further embodiment of the present disclosure may include selecting one of a multiple of apertures.

A method of additive manufacturing according to one disclosed non-limiting embodiment of the present disclosure can include moving a gate to selectively dispense one of a multiple of powders from a multi-powder dispenser, the gate movable with respect to a movement direction of a recoater blade.

A further embodiment of the present disclosure may include sliding a control strip.

A further embodiment of the present disclosure may include rotating a control strip formed in a continuous loop.

A further embodiment of the present disclosure may include selecting one of a multiple of apertures.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
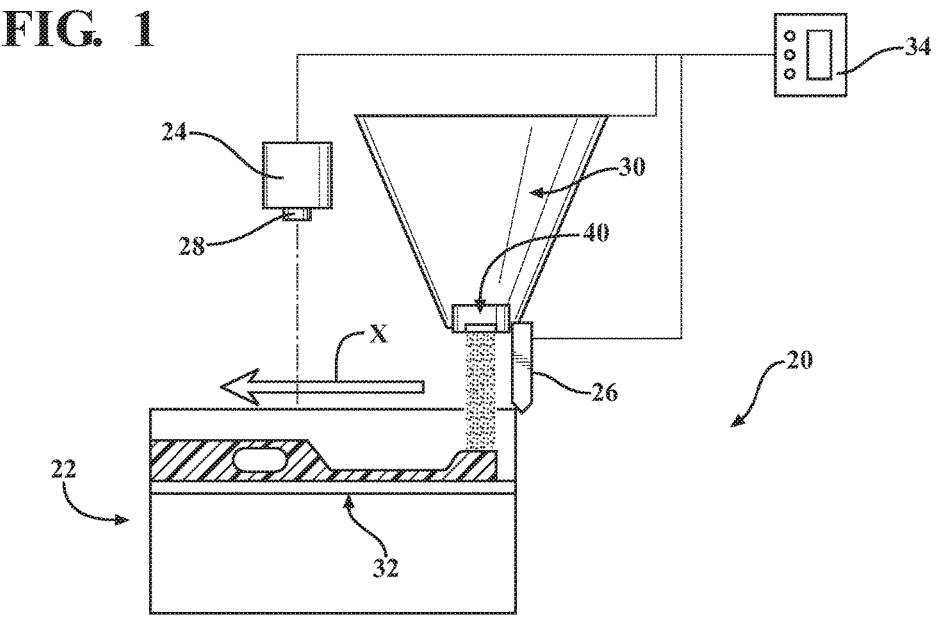
FIG. 1 is a general schematic view of an additive manufacturing system.

FIG. 1 schematically illustrates an additive manufacturing system 20. The system 20 generally includes a build platform 22, a laser 24, a recoater blade 26, a scanner head 28, a dispenser 30, a powder bed 32 and a control 34 (all illustrated schematically). It should be appreciated that various components and subsystems may additionally or alternatively provided. It should also be appreciated that as defined herein, "additive manufacturing" include, but are not limited to, selective laser melting (SLM), Direct Metal Laser Sintering (DMLS), Powder-Bed Electron Beam Melting (EBM), Electron Beam Free Form Fabrication (EBF3), Laser Engineered Net Shape (LENS) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that may include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is essentially "grown" slice-by-slice, or layer-by-layer, until finished. Each layer has an example depth between about 0.0005-0.001 inches (0.0127-0.0254 mm). The additive manufacturing process facilitates manufacture of the relatively complex internal passage geometry to minimize assembly details, gun-drilling, and multi-component construction.

The additive manufacturing process facilitates manufacture of relatively complex components to minimize assembly details and multi-component construction. The additive manufacturing process essentially "grows" components using three-dimensional information, for example, a three-dimensional computer aided design (CAD) model. The three-dimensional information is converted into a plurality of slices, each slice defining a cross section of the component for a predetermined height of the slice. The additive manufactured component is then "grown" slice-by-slice, or layer-by-layer, until finished.

The build platform 22 supports the powder bed 32, and may be closed hermetically for an inert gas which is intended to avoid unwanted reactions of the melt bath as formed by the laser 24. The scanner head 28 is mounted along the path of travel of the laser beam to focus and redirect the laser beam. The scanner head 28 may include mirrors driven by respective galvanometers in response to the control 34.

The powder bed 32 is where preheating, powder receipt, and sintering processes take place. The internal surface of the powder bed 32 may be manufactured of a stainless steel, covered by thermal insulation material, and includes an opening that allows the laser beam to pass therethrough and to scan on the target area of the build platform 22.

The build platform 22 may be lowered and/or the dispenser 30 raised so that the component can be produced in a stock of powder from the dispenser 30, while, in each case after a layer of the components has been produced by the laser 24, the build platform 22 is lowered by the amount of the thickness of the layer. Alternatively, the laser 24 and the recoater blade 26 are raised with respect to the component while the build platform 22 remains fixed. It should be understood that various combinations thereof may be provided to facilitate manufacture.

Figure 2:
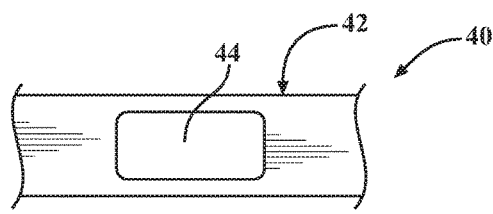
FIG. 2 is a general schematic view of a gate according to one disclosed non-limiting embodiment.

The dispenser 30 is located adjacent to the build platform 22 to dispense the powder through a gate 40. The gate 40, in one disclosed non-limiting embodiment includes a control strip 42 adjacent to the dispenser 30 with at least one aperture 44 therethrough (FIG. 2).

The control strip 42 controls a dose of powder from the dispenser 30 to the powder bed 32 upstream of the recoater blade 26 or other apparatus to further prep the powder bed 32 such as via the recoater blade 26, a roller, or other compaction device. That is, the recoater blade 26 moves (illustrated schematically by arrow X) to distribute the powder dispensed through the aperture 44 of the control strip 42.

Figure 3:
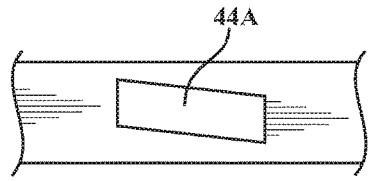
FIG. 3 is a general schematic view of a gate according to one disclosed non-limiting embodiment.
Figure 4:
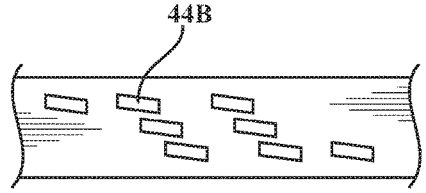
FIG. 4 is a general schematic view of a gate according to one disclosed non-limiting embodiment.
Figure 5:
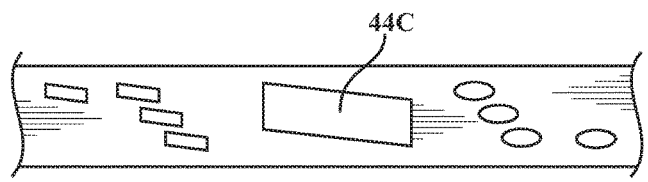
FIG. 5 is a general schematic view of a gate according to one disclosed non-limiting embodiment.
Figure 6:
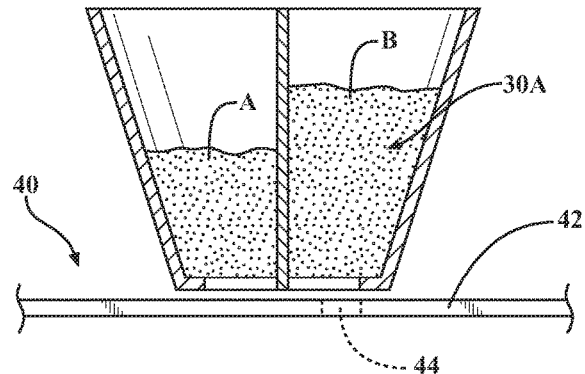
FIG. 6 is a general schematic view of a multi-powder dispenser according to one disclosed non-limiting embodiment.
Figure 7:
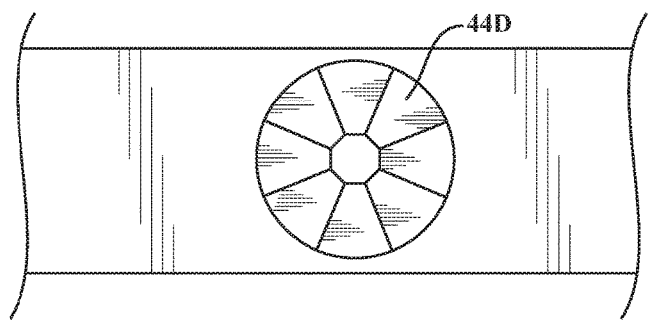
FIG. 7 is a general schematic view of a gate according to one disclosed non-limiting embodiment.

The control strip 42 may include at least one aperture 44 of a particular size (FIG. 2), an aperture 44A of a particular shape (FIG. 3), a multiple of common apertures 44B to form a pattern (FIG. 4); and/or a multiple of shaped and patterned apertures 44C (FIG. 5). Alternatively, the control strip 42 can be moved with respect to a multi-powder dispenser 30A to specifically dispense one of a multiple of powders, such as powder A and B, from within the multi-powder dispenser 30A (FIG. 6). Alternatively still, the control strip 42 can be moved in a manner to form a camera-style iris type aperture 44D for controlling the diameter and size of the opening (FIG. 7). It should be appreciated that various controllable apertures may be utilized.

In general, operation according to one disclosed non-limiting embodiment, the powder is dispensed to the build platform 22 from the dispenser 30 through the control strip 42 then distributed by the recoater blade 26 in response to the control 34. The build-up or "growth" of a component is directly in a layer-by-layer manner. That is, a computer file of the component is sliced into discrete layers having a certain thickness, which cumulatively provide the three-dimensional configuration of the component. Each layer includes a two-dimensional cross-sectional contour of the component.

Figure 8:
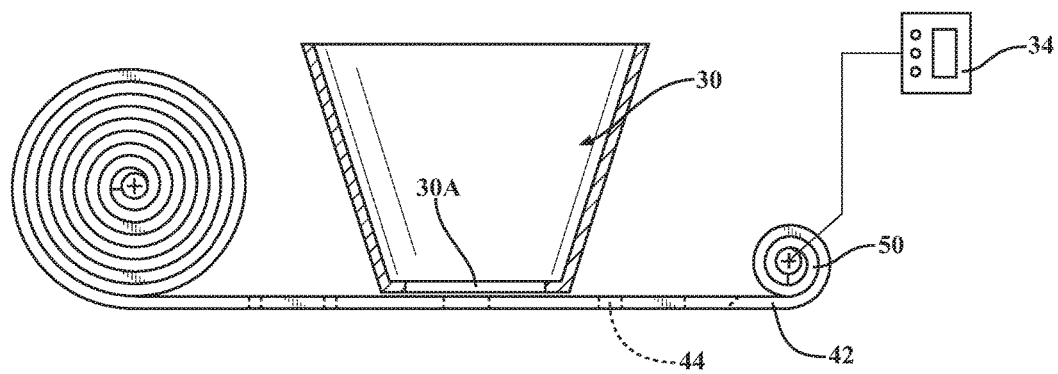
FIG. 8 is a general schematic view of an additive manufacturing system; with a gate according to one disclosed non-limiting embodiment
Figure 9:
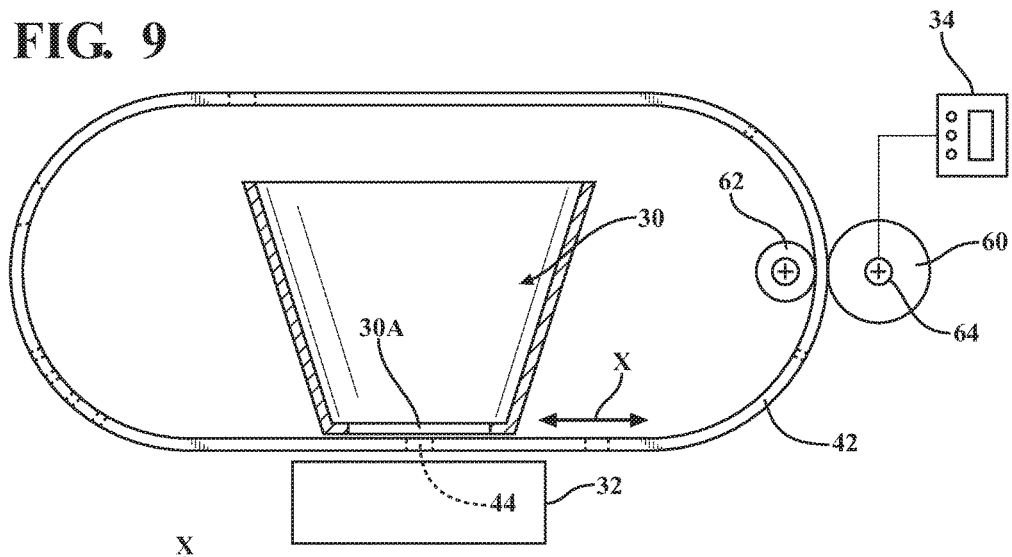
FIG. 9 is a general schematic view of an additive manufacturing system; with a gate according to one disclosed non-limiting embodiment

With reference to FIG. 8, in one embodiment, the control strip 42 may be a spring steel strip that is stretched across the dispenser 30 and controlled to dispense powder by sliding movement relative to a dispenser aperture 30A by a motor 50 in communication with the control 34. In this embodiment, the control strip 42 may slide back and forth in response to operation of the motor 50 to adjust the dispensation of the powder through the controlled aperture 44. Alternatively, the control strip 42 may roll and un-roll to locate a particular aperture 44 or portion of aperture 44 adjacent to the dispenser aperture 30A to control the dispensation of powder. In another embodiment, the control strip 42 may be a spring steel strip that is stretched across the dispenser 30 as a continuous loop (FIG. 9) and is controlled by roller 60, 62 to dispense powder by rotational movement relative to a dispenser aperture 30A by a motor 64 in communication with the control 34.

Figure 10:
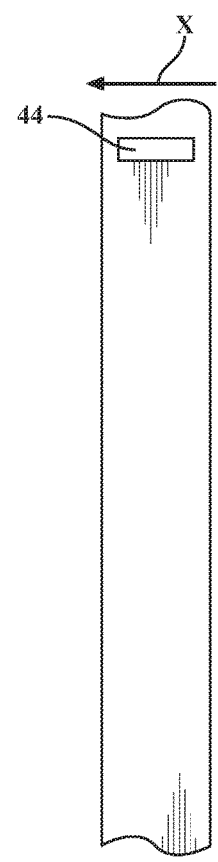
FIG. 10 is a schematic top view of a gate in a first position.
Figure 11:
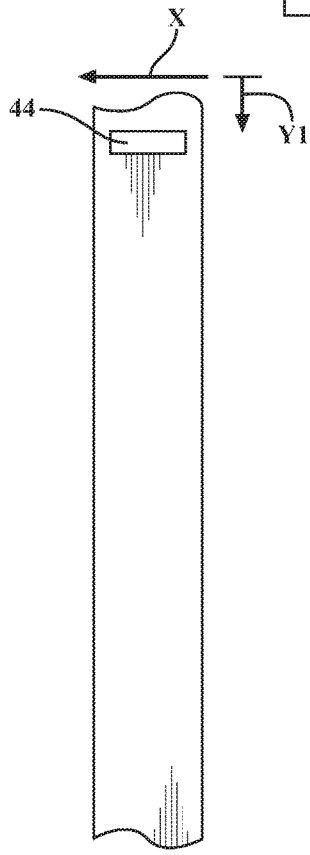
FIG. 11 is a schematic top view of a gate in a second position.
Figure 12:
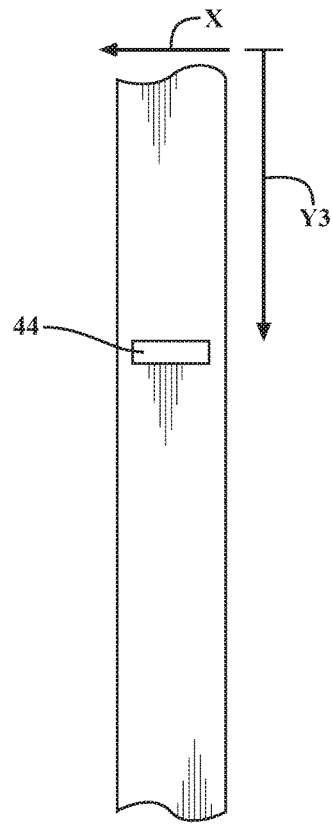
FIG. 12 is a schematic top view of a gate in a third position.

For example, the controlled aperture 44 may be moved to a first position at a first time (FIG. 10; movement illustrated schematically by arrow Y1), a second position at a second time (FIG. 11 movement illustrated schematically by arrow Y2); a third position at a third time (FIG. 12; movement illustrated schematically by arrow Y3), etc., relative to a direction of movement of the recoater blade 26 (movement illustrated schematically by arrow X). that is, the aperture 44 may move perpendicular to the movement to the of the recoater blade 26.

The control strip 42 of the gate 40 may be moved by the motor 50 in response to the control 34. That is, the gate 40 selectively dispenses the powder along the width of the powder bed 32 to selectively place the powder such that the recoater blade 26 passes along the powder bed 32 distributing the powder. The gate 40 selectively varies speed and position on the powder bed 32 to change the amount and/or depth of powder thereon.

Figure 13:
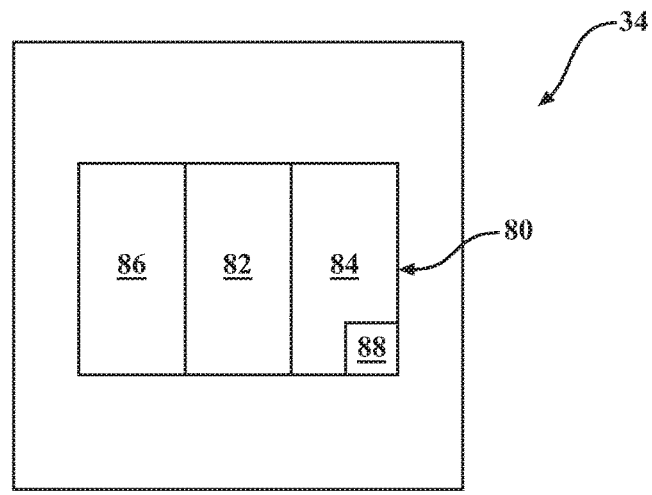
FIG. 13 is a schematic view of a control system.
Figure 14:
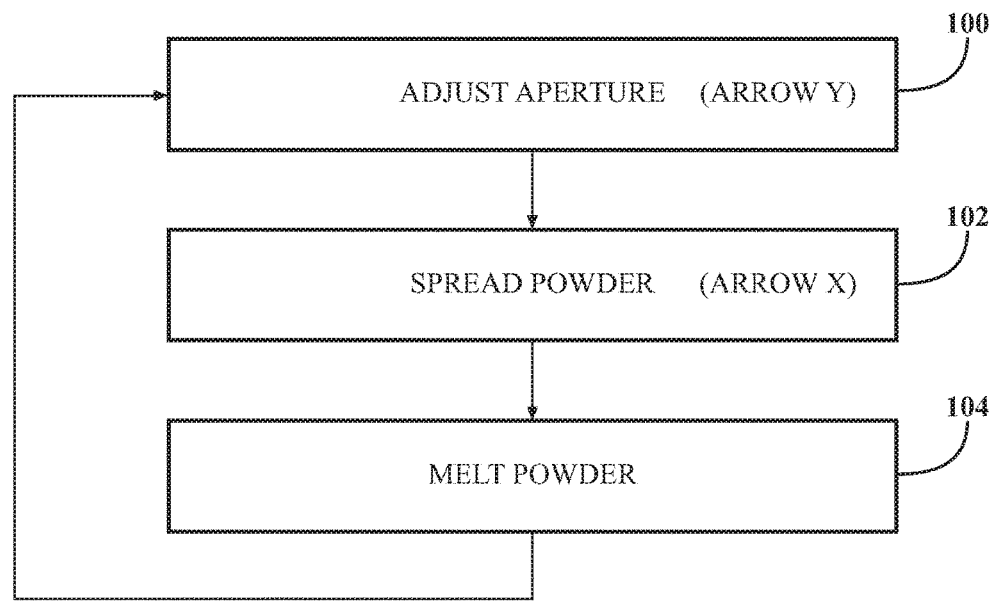
FIG. 14 is block diagram for operation of the additive manufacturing system.

The control 34 generally includes a control module 80 with a processor 82, a memory 84, and an interface 86 (FIG. 13). The processor 82 may be any type of microprocessor having desired performance characteristics. The memory 84 may include any type of computer readable medium, which stores the data and control algorithms described herein such as a controlled aperture algorithm 88 (FIG. 14). The functions of the algorithm 88 are disclosed in terms of functional block diagrams, which represent these functions, may be enacted in either dedicated hardware circuitry or programmed software routines capable of execution in a microprocessor based electronics control embodiment. Other operational software for the processor 82 may also be stored in the memory 84 to provide both manual and automatic Programmable Logic Controller (PLC) inputs. The interface 86 facilitates communication with other subsystems. It should be appreciated that the control 34 may be centralized or distributed. It should also be appreciated that various control inputs may be alternatively or additionally provided.

With reference to FIG. 14, after the controlled aperture 44 is positioned (step 100), the rigid recoater blade 26 is driven to sweep and spread the powder dispensed (step 102). The powder may be dispensed to correspond with, for example, a first cross-sectional region of the desired part. The control 34 controls the laser beam to selectively scan and melt the deposited powder within the confines of the defined boundaries of that layer (step 104). The laser beam heats the powder so as to melt, and the powder is joined together for that layer. After the laser 24 has processed each layer, the gate 40 again distributes fresh material powder over the partially grown component. The gate 40 readily facilitates dispensation of the powder in a different position or in a different manner than the prior layer.

The gate 40 provides for a potential decrease in recoat time; less waste of powder given that the powder is selectively placed on powder bed. The gate 40 also provides for predictable and reliable programmable placement of powder that permits multi-powder distribution; variable density; and the capability to selective place powder only where needed.

The use of the terms "a," "an," "the," and similar references in the context of the description herein (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the structural member and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that the steps of the sequences and methods described herein may be performed in any order, separated or combined unless otherwise indicated and will still benefit from the present disclosure.

The foregoing description is exemplary rather than defined by the limitations within. Various non-limiting embodiments are disclosed herein. However, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

The invention claimed is:

1. An additive manufacturing system comprising:
a powder dispenser;
a gate adjacent to the powder dispenser; and
a control operable to move the gate with respect to the powder dispenser to selectively dispense powder from the powder dispenser through the gate, wherein the control is operable to adjust a position of the gate to selectively dispense one of a multiple of powders from the powder dispenser with respect to a movement direction of a recoater blade, wherein the gate includes a multiple of different aperture shapes.

2. The system as recited in claim 1, wherein the control is operable to adjust a position of the gate to selectively dispense powder from the powder dispenser with respect to the movement direction of a recoater blade.

3. The system as recited in claim 1, wherein the gate slides with respect to the powder dispenser.

4. The system as recited in claim 1, wherein the gate rotates with respect to the powder dispenser.

5. The system as recited in claim 4, wherein the gate rotates around the powder dispenser as a continuous loop.

6. The system as recited in claim 1, wherein the gate includes a multiple of identical apertures that form a pattern.

7. The system as recited in claim 1, wherein the gate includes a multiple of different patterns.

8. The system as recited in claim 1, wherein the control is operable to adjust a position of the gate perpendicular to a movement direction of a recoater blade.

9. The system as recited in claim 1, wherein the control is operable to adjust a position of the gate to select one of a multiple of apertures.

10. The system as recited in claim 1, wherein the control is operable to adjust a position of the gate from a first position at a first time to a second position at a second time then to a third position at a third time relative to the direction of movement of a recoater blade.

* * * * *